Figure 1:
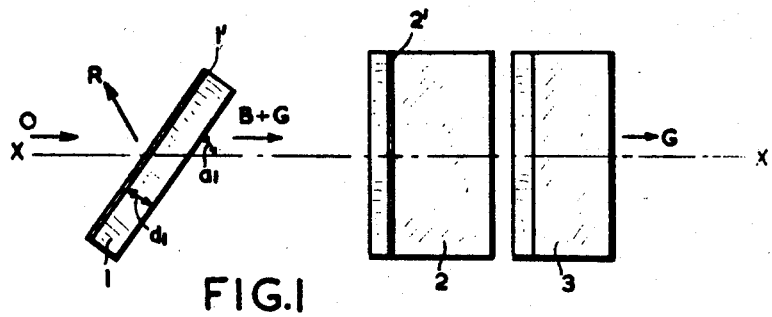

July 28, 1959

H. DE LANG 2,896,499

COLOUR-SELECTIVE OPTICAL SYSTEM CORRECTED
WITH REGARD TO ASTIGMATISM

Filed Feb. 12, 1957

INVENTOR
HENDRIK DE LANG

BY
AGENT

United States Patent Office 2,896,499
Patented July 28, 1959

2,896,499

COLOUR-SELECTIVE OPTICAL SYSTEM CORRECTED WITH REGARD TO ASTIGMATISM

Hendrik de Lang, Eindhoven, Netherlands, assignor, by mesne assignments, to North American Philips Company, Inc., New York, N.Y., a corporation of Delaware Application February 12, 1957, Serial No. 639,764

Claims priority, application Netherlands February 24, 1956

2 Claims. (Cl. 88—1)

Colour-selective optical systems are known, having a system of dichroic plane mirrors corrected with regard to astigmatism and positioned at an angle with one another. The astigmatism, which is attributable to the fact that the position angles of the two dichroic mirrors are relatively displaced through an angle of 180°, is corrected in these known systems by means of two other planoparallel transparent plates having position angles which are likewise relatively displaced through an angle of 180°, the plane containing the two position angles of the last-mentioned planoparallel plates being at right angles to the plane containing the position angles of the two dichroic mirrors. Such a construction requires a comparatively large structural length of the optical system. Furthermore, the disadvantage of increased weight is involved especially for transportable devices.

The object of the present invention is to mitigate said disadvantage. The invention underlies recognition of the fact that by means of suitable positioning and proportioning of the dichroic mirrors it is possible to arrive at a construction in which the astigmatic errors on the axis introduced into the system by one di-chroic mirror may be corrected by the other dichroic element.

In accordance with the invention, the colour-selective optical system of the above-mentioned kind is characterized in that, as reckoned from the side of the non-divided light, the first colour-selective layer is provided on the front side of a transparent plane planoparallel plate having a thickness $d_1$ and a refractive index $n_1$ and making an angle $a_1$ with the optical axis, whereas the second-colour-selective layer is provided on the rear side of a second planoparallel plate of transparent material having a thickness $d_2$ and a refractive index $n_2$ and making an angle $a_2$ with the optical axis. This second plate is followed by a third planoparallel plate of transparent material having a thickness $d_3$ and a refractive index $n_3$ and making an angle $a_3$ with the axis of the optical system. With respect to the position angle of the first plate, the position angles of the second and third plates are each displaced through an angle of approximately 90°. Furthermore, the thicknesses, the refractive indices and the angles made by these plates with the optical axis are chosen in accordance with the invention to be such that:

$$\frac{(n_1^2-1)d_1 \cos^2 a_1}{2(n_1^2-\cos^2 a_1)^{3/2}} \approx \frac{(n_2^2-1)d_2 \cos^2 a_2}{(n_2^2-\cos^2 a_2)^{3/2}} \approx \frac{(n_3^2-1)d_3 \cos^2 a_3}{(n_3^2-\cos^2 a_3)^{3/2}}$$

In one advantageous embodiment of the optical system according to the invention, the three planoparallel plates have the same refractive indices and the same position angles while the adjacent surfaces of the second and third planoparallel plates are separated only by the colour-selective layer and the thickness of both the second and the third plate is half that of the first plate.

Figure 2:
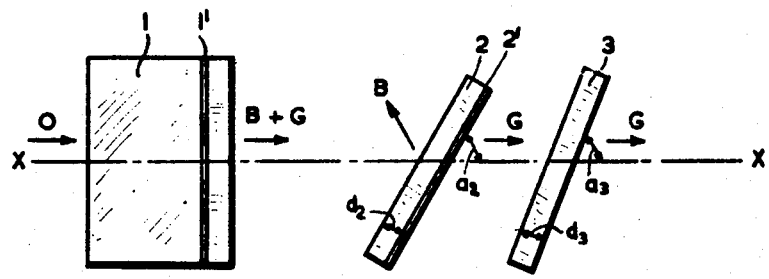

In order that the invention may be readily carried into effect, two embodiments will now be described more fully by way of example, with reference to the accompanying drawing, in which Figs. 1 and 2 show a first embodiment of the dichroic part of the mirror used in the optical system according to the invention, in elevation view and in side-view, respectively.

Figure 3:
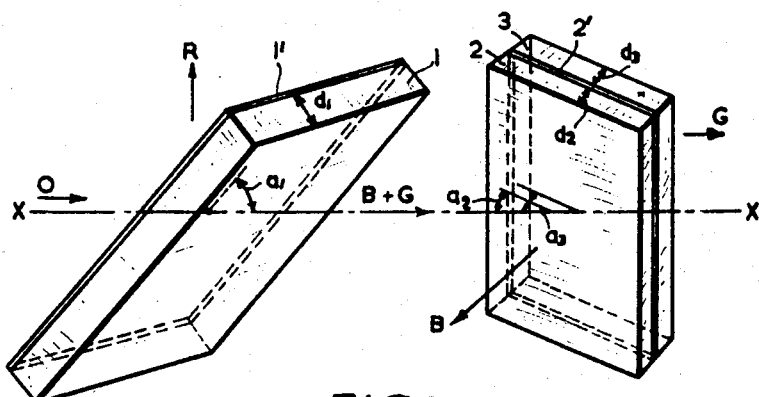

Fig. 3 shows another embodiment of said system.

The embodiment shown in Figs. 1 and 2 comprises three planoparallel plates 1, 2 and 3, which in this example are made of glass having refractive indices $n_1$, $n_2$ and $n_3$. On the front side, that is to say the side adjacent the non-divided light indicated by 0 and consisting of the basic colours red (R), blue (B) and green (G), the plate 1 is provided with a layer 1' which is selectively reflecting for the red basic colour indicated by R. Due to the presence of the layer, the red spectral portion of the non-divided light 0 is reflected by the layer 1' in the direction R.

A layer 2', which is selectively reflecting for the basic colour blue (B), is provided on the rear side of the planoparallel plate 2. This layer results in the blue light portion of the light B+G, which emerges from the plate 1, being reflected in the direction of arrow B, so that only the light of the basic colour green, indicated by G, can emanate from the rear side of the element 2. This green light passes through the carrier 3, which is not provided with a colour-selective layer, leaving it on the rear side, as shown diagrammatically in Fig. 2.

It may be seen from Figs. 1 and 2 that the element 1 makes an angle $a_1$ with the optical axis X—X. This angle will be indicated hereinafter as the position angle $a_1$. From Fig. 2 it follows that the elements 2 and 3 make angles $a_2$ and $a_3$, respectively, with the optical axis X—X, which angles may be different from one another. The last-mentioned angles will be referred to hereinafter as the position angles $a_2$ and $a_3$.

In accordance with the invention, the position angles $a_2$ and $a_3$ are in this example each displaced in the same sense through an angle of approximately 90° about the optical axis X—X with respect to the position angle $a_1$ of the element 1.

If it is insured by a suitable choice of the thicknesses $d_1$, $d_2$ and $d_3$ of the plates 1, 2 and 3 and further of the position angles $a_1$, $a_2$ and $a_3$ and of the refractive indices $n_1$, $n_2$ and $n_3$ that the following conditions are fulfilled:

$$\frac{(n_1^2-1)d_1 \cos^2 a_1}{2(n_1^2-\cos^2 a_1)^{3/2}} \approx \frac{(n_2^2-1)d_2 \cos^2 a_2}{(n_2^2-\cos^2 a_2)^{3/2}} \approx \frac{(n_3^2-1)d_3 \cos^2 a_3}{(n_3^2-\cos^2 a_3)^{3/2}}$$

it is achieved that the astigmatism which would exist if the elements 1 and 2 were arranged in the usual manner with their position angles in the same plane is substantially eliminated. It will be evident that the above-mentioned condition must be fulfilled more or less severely, depending upon the requirements imposed upon an optical system utilizing said dichroic mirror system.

An even simpler solution is obtained if one proceeds in the manner illustrated in Fig. 3. In this figure, the same symbols as in Figs. 1 and 2 are used for identical parts. However, in the embodiment shown in Fig. 3, the refractive indices $n_1$, $n_2$ and $n_3$ of the plates 1, 2 and 3 are the same and the thicknesses $d_2$ and $d_3$ of the plates 2 and 3 are each half of the thickness $d_1$ of the plate 1. Furthermore, the rear side of the plate 2 is positioned directly against the front side of the plate 3 with the interposition of a layer 2' which is selectively reflecting for the basic colour blue. Not only are the position angles $a_2$ and $a_3$ of the elements 2 and 3 displaced through 90° about the optical axis X—X with respect to the position angle $a_1$, but also are the position angles $a_2$ and $a_3$ the same, as will already be evident from the foregoing. This arrangement is highly free of astigmatism and nevertheless has substantially the same structural length and the same weight as the conventional diochroic plane pairs of mirrors which are not corrected with regard to astigmatism.

In the foregoing it has been mentioned that, in accordance with the invention, the condition must be fulfilled that the position angles $a_2$ and $a_3$ must each be displaced approximately 90° about the optical axis with respect to the position angle $a_1$. In view of the compactness of the device, said displacement is preferably affected in the same sense, as is also shown. However, if desired, the position angles $a_2$ and $a_3$ may be displaced about the optical axis X—X through the angle of approximately 90° with respect to the position angle $a_1$ in selectively opposite senses.

What is claimed is:

1. A color-selective optical system having a plurality of dichroic plane mirrors corrected with regard to astigmatism comprising as seen from the direction of projection of the non-divided light a first plano-parallel plate having a thickness $d$, and provided with a first color selective layer on the side where said light enters, said first plate having a refractive index $n$, and making an angle $a$ with the optical axis of said system, a second plano-parallel plate positioned behind said first plate with respect to the path of light having a thickness $d_2$ and provided with a second color selective layer on the side remote from said first plate, said second plate having a refractive index $n_2$ and making an angle $a_1$ with the optical axis of said system, a third plano-parallel plate of transparent material positioned behind said second plate with respect to the path of light having a thickness $d_3$, said third plate having a refractive index $n_3$ and making an angle $a_3$ with the axis of the optical system, the angles $a_2$ and $a_3$ being displaced approximately 90° about the optical axis relative to the angle $a_1$, the thicknesses and the refractive indices of said plates together with the angles made by said plates with the optical axis being so chosen that:

$$\frac{(n_1^2-1)d_1\cos^2 a_1}{2(n_1^2-\cos^2 a_1)^{3/2}} \approx \frac{(n_2^2-1)d_2\cos^2 a_2}{(n_2^2-\cos^2 a_2)^{3/2}} \approx \frac{(n_3^2-1)d_3\cos^2 a_3}{(n_3^2-\cos^2 a_3)^{3/2}}$$

2. A color-selective optical system as claimed in claim 1 wherein said first, second and third plano-parallel plates have the same refractive indices and the same position angles with respect to the optical axis of the system, and said second color-selective layer is positioned between said second and third plano-parallel plates, the thickness of each of said second and third plano-parallel plates which are in abutting relationship with said second color-sensitive layer being approximately one half that of said first plano-parallel plate.

References Cited in the file of this patent

UNITED STATES PATENTS

| | | |
|---|---|---|
| 2,672,072 | Sachtleben et al. | Mar. 16, 1954 |
| 2,672,502 | Albright | Mar. 16, 1954 |
| 2,740,832 | Andrews | Apr. 3, 1956 |
| 2,792,740 | Haynes | May 21, 1957 |
| 2,797,256 | Millspaugh | June 25, 1957 |